Aug. 3, 1965   W. T. LORENZ   3,198,214
FLUID REGULATOR
Filed Oct. 30, 1963   3 Sheets-Sheet 2

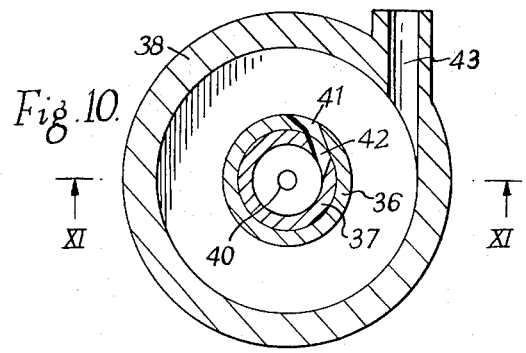
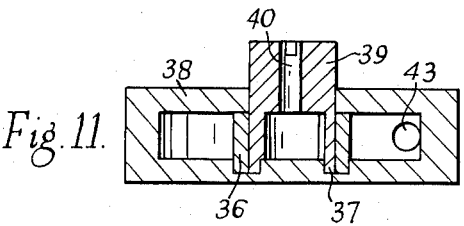
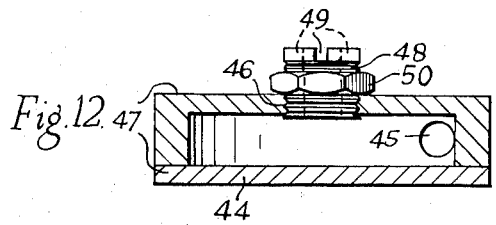
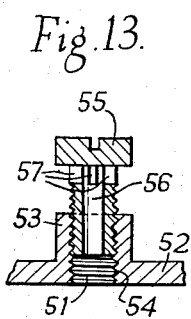
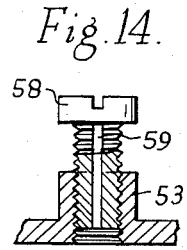
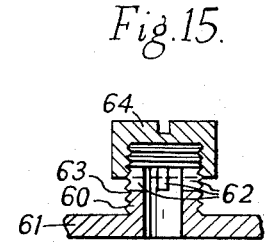

United States Patent Office 3,198,214
Patented Aug. 3, 1965

3,198,214
FLUID REGULATOR
Wilhelm T. Lorenz, Socking, Germany, assignor to R.I.V. Anstalt zur Verwaltung von Real- und Immaterialvermogen, Schaan, Liechtenstein
Filed Oct. 30, 1963, Ser. No. 320,613
Claims priority, application Germany, Oct. 30, 1962, R 33,786
5 Claims. (Cl. 138—37)

The invention relates to a through-flow regulator for liquids or gases wherein the through-flow quantity is regulated in dependence upon the speed of flow, which regulator comprises no movable parts and the regulating behaviour and response time of which can be adjusted.

As is known, through-flow regulators with movable regulating members incline to fluttering at critical flow speeds, so that the regulating effect fails entirely or partially in the region of the critical speed of flow. Furthermore the movable members can be jammed by impurities in the flowing medium, so that further regulation is precluded.

According to the invention these disadvantages are to be removed due to the fact that with a rotationally symmetrical flow chamber there are associated one or more tangential inflow channels and one or two concentric outflow channels.

The regulating effect of the through-flow regulator according to the invention is based upon the fact that with increasing speed of flow there is formed in the flow chamber an eddy which becomes increasingly stronger, and forces the medium away from the concentric discharge openings as a result of the centrifugal force. Accordingly an increase of the speed of flow results in a continuous decrease of the through-flow quantity per unit of time. In the extreme case the action of the centrifugal force can become so great that the outlet is almost entirely blocked. On the other hand the centrifugal force is nearly without influence at low speeds of flow.

Where a plurality of tangential inlets are used it is expedient, in order to avoid a tilting moment which makes itself noticeable in disturbing fashion especially where the through-flow regulator is installed in movable members, such as shock-absorbers, to arrange these inlets in rotational symmetry.

The end faces of the flow chamber are advantageously so formed that their spacing from the cylindrical axis increases or decreases linearly, continuously or intermittently, according to the desired regulating effect. Under certain circumstances it may also be advantageous to make this variation of spacing non-linear.

By such a design of the end face however not only the regulating behaviour but also the response sensitivity of the through-flow regulator is influenced. An increase of the response sensitivity, desired in the case of many uses, is achieved due to the fact that the spacing of the end walls is made less in the middle, which can be achieved by suitable formation of these walls or by means of insert elements.

This measure has the result that on the occurrence of a flow only a relatively small quantity of the flow medium must be set in circulation, the major part of this medium already having a relatively great distance from the centre of the eddy, whereby the centrifugal force is increased.

Furthermore the protruding end wall or the insert element forces out of the flow chamber the part of the flow medium which on impact with the eddy would have escaped through the coaxial bore and thus been lost for the regulating action.

The insert element for arrangement in the flow chamber is advantageously secured on the end wall lying opposite to the coaxial bore, its maximum axial dimension being less than the distance of the end walls of the flow chamber from one another. According to the purpose of the regulator, the insert element can possess the form of a cylinder, a cone or a concial frustum.

If the through-flow regulator according to the invention is to be arranged for example in the piston of a shock-absorber, in place of the valves usual hitherto, there can advantageously be provided in the insert element and the corresponding end wall of the flow chamber a bore with internal threading, into which the piston rod is screwed, thus being connected with the piston. In the same example of use it is also possible to screw the piston rod through an internally threaded bore into the end wall of the flow chamber so far that the piston rod part extending into the chamber acts as insert element.

The conditions of flow in the flow chamber can naturally be influenced not only by the formation of the end walls but also by appropriate shaping of the lateral wall. Thus the flow chamber can be made conical or approximately conical, the inflow channel of the flow medium being introduced tangentially into the flow chamber at the region of the maximum diameter of the cone, while the outflow channel is arranged coaxially at the point of the minimum cone diameter.

According to whether a greater or lesser flow dependence of the throttle action of the through-flow regulator is required, according to a further development of the invention the direction of flow in the conical flow chamber can be reversed, in that the inflow channel is introduced tangentially into the flow chamber in the narrower part of the cone, while the outflow channel is conducted as coaxial bore through the end wall.

Beside the influencing of the flow conditions in the flow chamber by the design of the limiting surfaces, such influencing can also be effected by inserts, such as baffles, by means of which more especially an improvement of the response time can be achieved.

Such a guide surface can be formed in the shape of a longarithmic spiral or of a hollow cylinder, which possesses a passage slot for the flow medium, the defining surfaces of the passage slot in the hollow cylinder preferably extending tangentially of the inner defining surface thereof.

A further increase of the speed of response is obtained if a plurality of hollow cylinders are arranged coaxially in the flow chamber in such manner that between the inner surface of the one hollow cylinder and the outer surface of the next smaller hollow cylinder an annular space occurs, the annular spaces thus formed being connected with one another through passage slots. The latter are more expediently arranged offset in relation to one another, so that the flow medium penetrating through a passage slot as a result of its tangential direction of entry first passes through the annular space between the two hollow cylinders before it escapes from the annular space through the passage slot of the smaller hollow cylinder.

A further advantageous possibility of influencing occurs if two hollow cylinders are arranged coaxially and without interspace within one another, at least one of these hollow cylinders being rotatable, so that the passage slots in the two hollow cylinders are more or less extensively adjustable in relation to one another by rotation of the one, and thus the passage cross-section can be influenced.

In all the forms of embodiment as described hitherto it can be expedient to equip the central bores with adjustment means.

As adjustment means there preferably serves a hollow cylinder, the axial length of which is greater than the height of the flow chamber and which is adjustable in the axial direction in the central bore of the end wall.

A further advantageous solution is produced if the central bore is prolonged by a cylindrical extension piece on the outer side of the end wall and is provided with internal threading into which there may be screwed a set screw as adjustment means, the shank of which screw is pierced by an axial bore which possesses one or more radial openings penetrating the shank in the region of the screw head.

In place of the axial bore and the radial openings allocated thereto, the set screw can be provided with longitudinal grooves which extend over the entire length of the screw shank.

A further expedient solution arises if the cylindrical extension piece on the outer side of the end wall is provided with one or more longitudinal slots and an external threading, so that the passage cross-section of the longitudinal slots can be adjusted according to desire by means of a cap nut.

In order to prevent undesired displacement of the adjusting means, between the threadings there is expediently arranged a tough elastic interlayer, preferably of tubular form.

If subsequent attempts at adjustment are to be precluded, it is advantageous to make the adjusting means immovably fast, for example by a welded or soldered connection.

By the described adjusting means it is possible to influence the passage behaviour of the through-flow regulator according to the invention within wide limits, without the necessity of variation of the dimensions of the flow chamber, that is to say the through-flow regulator with the same basic dimensions and thus also the same passage behaviour can be adapted to the requirements in each case without great expense of time and material. Thus by the measures according to the invention it is possible to satisfy the most various requirements with one basic type.

Examples of embodiment of the invention are represented in the drawing, wherein:

FIGURE 10 shows a flow chamber with cylindrical guide surface, the passage cross-section of which is adjustable, in section;

FIGURE 11 shows a section through FIGURE 10 along the line XI—XI;

FIGURE 12 shows in cross-section a through-flow regulator with an adjustable hollow cylinder as adjusting means;

FIGURE 13 shows a set screw with hollow shank as adjusting means;

FIGURE 14 shows a set screw with longitudinal grooves as adjusting means, and

FIGURE 15 shows a cap nut as adjusting means.

Figure 1:
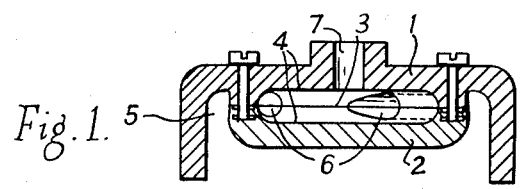
FIGURE 1 shows a through-flow regulator with parallel end walls of the flow chamber in section.
Figure 2:
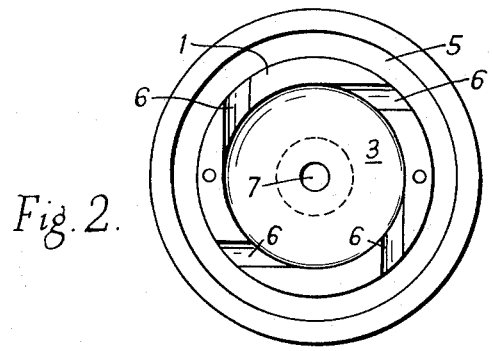
FIGURE 2 shows a view of the upper part in the direction of flow.
Figure 3:
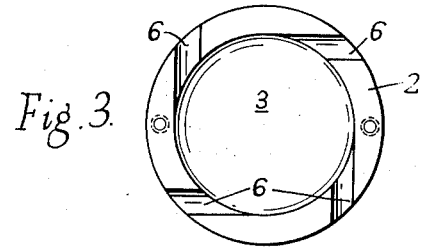
FIGURE 3 shows a view of the lower part contrary of the direction of flow.

In the housing, consisting of the upper part 1 and the lower part 2, there is arranged the cylindrical flow chamber 3, the end faces 4 of which have a parallel course. The flow medium, the through-flow quantity of which is to be regulated, enters the flow chamber 3 by way of an annular groove 5 through the channels 6 arranged tangentially of the flow chamber 3, and leaves the latter again through an axial bore 7, which is arranged centrally of the flow chamber 3.

Figure 4:
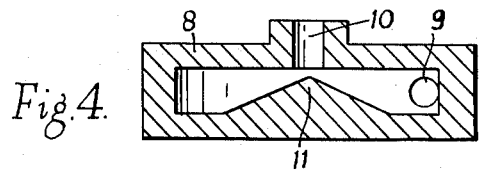
FIGURE 4 shows a section through a through-flow regulator with conical formation of the middle part of one end wall.
Figure 5:
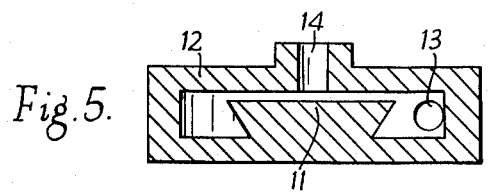
FIGURE 5 shows a section through a through-flow regulator with frusto-conical formation of the middle part of one end wall.

In the flow chamber 8 according to FIGURE 4, with which there are associated a tangential channel 9 preferably narrowing in the direction towards the flow chamber and an axial bore 10, on the end wall lying opposite to the bore 10 there is arranged a rotationally symmetrical insert element 11. While the insert element 11 as represented in FIGURE 4 is conical, the insert element according to FIGURE 5 is formed by a conical frustum. The insert element 11 can be secured according to the desired behaviour of the regulator, with its larger or smaller circular surface on the end wall of the flow chamber 12, or it can also be made cylindrical. The flow chamber 12 is also equipped with a tangential channel 13 and a coaxial bore 14.

Figure 6:
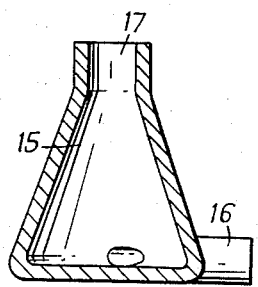
FIGURE 6 shows a through-flow regulator with conical flow chamber without insert element.

The through-flow regulator according to FIGURE 6 possesses a conical flow chamber 15 into which the inflow channel 16 opens tangentially in the region of its larger diameter. The outflow channel 17 is formed by a coaxial bore in the narrower part of the cone.

Figure 7:
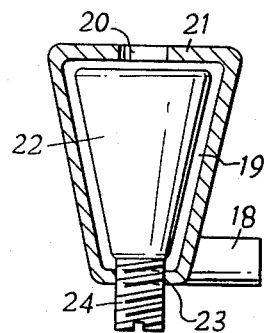
FIGURE 7 shows a through-flow regulator with conical flow chamber and insert element.

In FIGURE 7 the inflow channel 18 is introduced tangentially into the flow chamber 19 in the narrower part of the cone, while the outflow channel 20 is conducted as coaxial bore through the end wall 21.

For the voluntary influencing of the speed of response and of the regulating behaviour of the through-flow regulator however in the flow chamber 19 there is axially adjustably arranged an insert element 22. The adjustment takes place by means of a screw bolt 24 conducted through the end wall 23 and secured to an end surface of the insert element 22.

By adjustment of the screw bolt 24 the insert element 22 is shifted axially, so that the cross-section of the annular gap in the flow chamber 19 varies. At the same time the outflow conditions of the outflow channel 20 are also varied.

Figure 8:
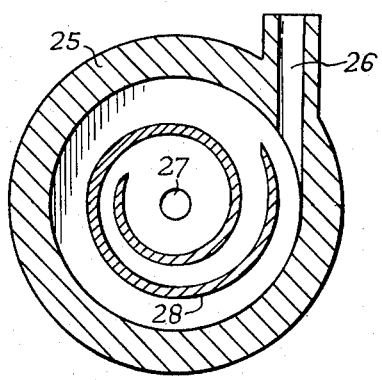
FIGURE 8 shows a flow chamber with spiral guide surface in section.

In the flow chamber 25 according to FIGURE 8, which possesses a tangential inlet channel 26 and a central outlet channel 27, there is arranged a guide surface 28 in the form of a spiral, for example a logarithmic spiral. The medium entering the flow chamber through the tangential inlet channel 26 is compelled by this spiral on to a spiral path from the commencement of flow, so that in the region of the central outlet channel 27 a second eddy forms which influences the blocking action of the through-flow regulator the more, the higher is the speed of flow of the medium situated therein. This speed of flow is however the higher, the greater is the entry cross-section of the spiral guide surface 28 in relation to its exit cross-section, since the speed of flow necessarily increases as the through-flow cross-section narrows constantly in the spiral.

Figure 9:
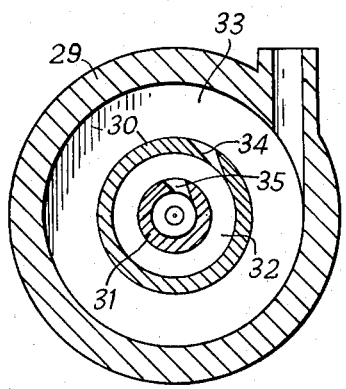
FIGURE 9 shows a flow chamber with cylindrical guide surfaces in section.

In the flow chamber 29 according to FIGURE 9 two hollow cylinders 30 and 31 are arranged concentrically, the dimensions of these hollow cylinders being so selected that between the inner defining surface of the one and the outer defining surface of the other an annular space 32 is produced, while between the outer defining surface of the larger hollow cylinder 30 and the cylindrical defining surface of the flow chamber 29 a further annular space 33 is formed. While the annular spaces 32 and 33 are connected with one another through a slot 34 situated in the hollow cylinder 30, the defining surfaces of which preferably extend tangentially of the inner defining surface of the hollow cylinder, the annular space 32 is connected with the outlet channel through a slot 35 in the hollow cylinder 31, the slot 35 being made similar to the slot 34.

Due to the spatial arrangement of the passage slots 34 and 35 the flow medium entering through the tangential inlet channel is compelled first to pass through the annular space 33, whereby an eddy is already formed, by which the major part of the medium is forced away from the passage slot 34 as a result of the centrifugal force. The part of the flow medium still passing through the slot is compelled in the annular space 32 into a circular path, as a result of the tangential arrangement of the slot 34, the influence of the centrifugal force here again forcing the major part of the medium situated in the annular space 32 away from the passage slot 35 in the hollow cylinder 31. The relatively small proportion of the flow medium which passes through the slot 35 of the hollow cylinder 31 will form in the region of the axial outlet channel a further eddy, so that only a small quantity of the flow medium is necessary in order to bring the static through-flow regulator to response, that is to say the regulating action will commence immediately after flow occurs.

Due to the tangential arrangement of the lateral defining surfaces of the passage slots 34 and 35 in relation to the inner defining surfaces of the hollow cylinders 30 and 31, apart from the tangential direction of admission for the flow medium, an increase of the speed of flow is also achieved as a result of the narrowing slot cross-section. This effect is desired, since the centrifugal force increases in dependence upon the speed of flow.

In the example of embodiment according to FIGURES 10 and 11 the two hollow cylinders 36 and 37 are so dimensioned that no interspace remains between the inner surface of the larger and the outer surface of the smaller. The smaller hollow cylinder 37 is more expediently so formed that it possesses a part 39 protruding out of the flow chamber 38, in the centre of which there is arranged the outlet channel 40. The hollow cylinder 37 is rotatably arranged so that the passage cross-section between the passage slots 41 and 42 can be varied. The inlet channel 43 serves for the supply of the medium.

The flow chamber 44 according to FIGURE 12 is provided with a tangentially entering channel 45 and a central bore 46 in one of the two end walls 47. In the bore 46 there is a threading, so that a hollow cylinder 48, which is provided with an external threading and adjusting grooves 49, can be screwed into the bore 46. The position of the hollow cylinder 48 can be fixed by means of a lock nut 50.

By the adjustment of the hollow cylinder 48 the regulating effect can be largely influenced. Thus for example the flow resistance will be substantially higher when the hollow cylinder is almost completely screwed in than when the latter extends only a little or not at all into the flow chamber.

In FIGURES 13 and 14 the central bore 51 of the end wall 52 is prolonged by a cylindrical extension piece 53 and provided with an internal threading 54. Into this threading there is partially screwed a set screw 55, according to FIGURE 13, the shank of which is pierced by an axial bore 56, whence radial openings 57 penetrate the screw shank in the region of the screw head.

In contrast to this example the set screw 58 according to FIGURE 14 possesses a solid screw shank, which is provided with one or more longitudinal grooves 59.

IN FIGURE 15 the cylindrical extension piece 60 of the end wall 61 is provided with one or more longitudinal slots 62 and an external threading 63. The passage cross-section of the slots 62 can be adjusted according to desire by means of a cap nut 64, just as the depth of screwing in of the set screws 55, 58 and of the cap nut 64 determines the passage cross-section of the piercings 57, the grooves 59 or the slots 62 respectively.

I claim:

1. A through-flow regulator for fluids in which the through-flow quantity is dependent upon the speed of flow, comprising
    (a) a hollow body defining a cylindrical chamber having end walls parallel to each other, one of said end walls closing entirely one end of the body,
    (b) at least one inflow channel communicating with said chamber and provided in said body tangential to said chamber,
    (c) an outflow channel communicating with said chamber and arranged on the longitudinal axis of said chamber in the other end wall,
    (d) a first annular member concentric with said chamber and extending between the end walls thereof, said annular member having openings therein to permit through-flow of fluid, and
    (e) a second annular member concentric with said chamber and closely fitting within said first annular member, said second annular member having openings therein which communicate with the openings in said first annular member, and said second annular member being rotatable within said first annular member whereby adjustment of the through-flow is achieved.

2. A through-flow regulator for fluids in which the through-flow quantity is dependent upon the speed of flow, comprising
    (a) a hollow body defining a cylindrical chamber having end walls parallel to each other, one of said end walls closing entirely one end of the body,
    (b) at least one inflow channel communicating with said chamber and provided in said body tangential to said chamber,
    (c) an outflow channel communicating with said chamber and arranged on the longitudinal axis of said chamber in the other end wall, and
    (d) an adjusting means in said outflow channel, said adjusting means comprising a hollow cylinder adjustable in the direction axially of the outflow channel, the axial length of said cylinder being greater than the height of the cylindrical chamber.

3. A through-flow regulator for fluids in which the through-flow quantity is dependent upon the speed of flow, comprising
    (a) a hollow body defining a cylindrical chamber having end walls parallel to each other, one of said end walls closing entirely one end of the body,
    (b) at least one inflow channel communicating with said chamber and provided in said body tangential to said chamber,
    (c) an outflow channel communicating with said chamber and arranged on the longitudinal axis of said chamber in the other end wall,
    (d) a cylindrical extension piece on the end wall of the hollow body which extension piece prolongs the outflow channel, said extension piece being provided with an internal threading, and
    (e) a set screw screwed into said threading and having an axial bore and at least one radial opening near the outer end of the screw providing communication from said bore and the exterior of the screw.

4. A through-flow regulator for fluids in which the through-flow quantity is dependent upon the speed of flow, comprising
    (a) a hollow body defining a cylindrical chamber having end walls parallel to each other, one of said end walls closing entirely one end of the body,
    (b) at least one inflow channel communicating with said chamber and provided in said body tangential to said chamber,
    (c) an outflow channel communicating with said chamber and arranged on the longitudinal axis of said chamber in the other end wall, (d) a cylindrical extension piece on the hollow body providing an extension of the outflow channel and having internal threading, and (e) a set screw screwed into said threading, the shank of the screw having at least one longitudinal groove therein.

5. A through-flow regulator for fluids in which the through-flow quantity is dependent upon the speed of flow, comprising (a) a hollow body defining a cylindrical chamber having end walls parallel to each other, one of said end walls closing entirely one end of the body, (b) at least one inflow channel communicating with said chamber and provided in said body tangential to said chamber, (c) an outflow channel communicating with said chamber and arranged on the longitudinal axis of said chamber in the other end wall, (d) a cylindrical extension piece on the hollow body providing an extension of the outflow channel, said extension piece having at least one longitudinal slot therein and having external threading, and (e) a cap nut adjustably threaded on to said extension piece.

References Cited by the Examiner

UNITED STATES PATENTS

| 1,381,095 | 6/21 | Starr | 239—468 |
|---|---|---|---|
| 1,517,598 | 12/24 | Stevenson | 137—604 |
| 1,693,629 | 12/28 | Webre | 239—110 |
| 2,653,801 | 9/53 | Fontein et al. | |
| 2,893,432 | 7/59 | Gibson | 138—42 |
| 2,942,684 | 6/60 | Bennett. | |
| 3,083,917 | 4/63 | Abplanalp et al. | 239—468 |

FOREIGN PATENTS

| 954,941 | 6/49 | France. |
|---|---|---|

LAVERNE D. GEIGER, *Primary Examiner.*

EDWARD V. BENHAM, LEWIS J. LENNY, *Examiners.*